May 2, 1933.  J. J. JAKOSKY  1,906,271

METHOD AND APPARATUS FOR DETERMINING UNDERGROUND STRUCTURE

Filed June 1, 1931  4 Sheets-Sheet 1

INVENTOR.
John J. Jakosky,
BY *(signatures)*
ATTORNEYS.

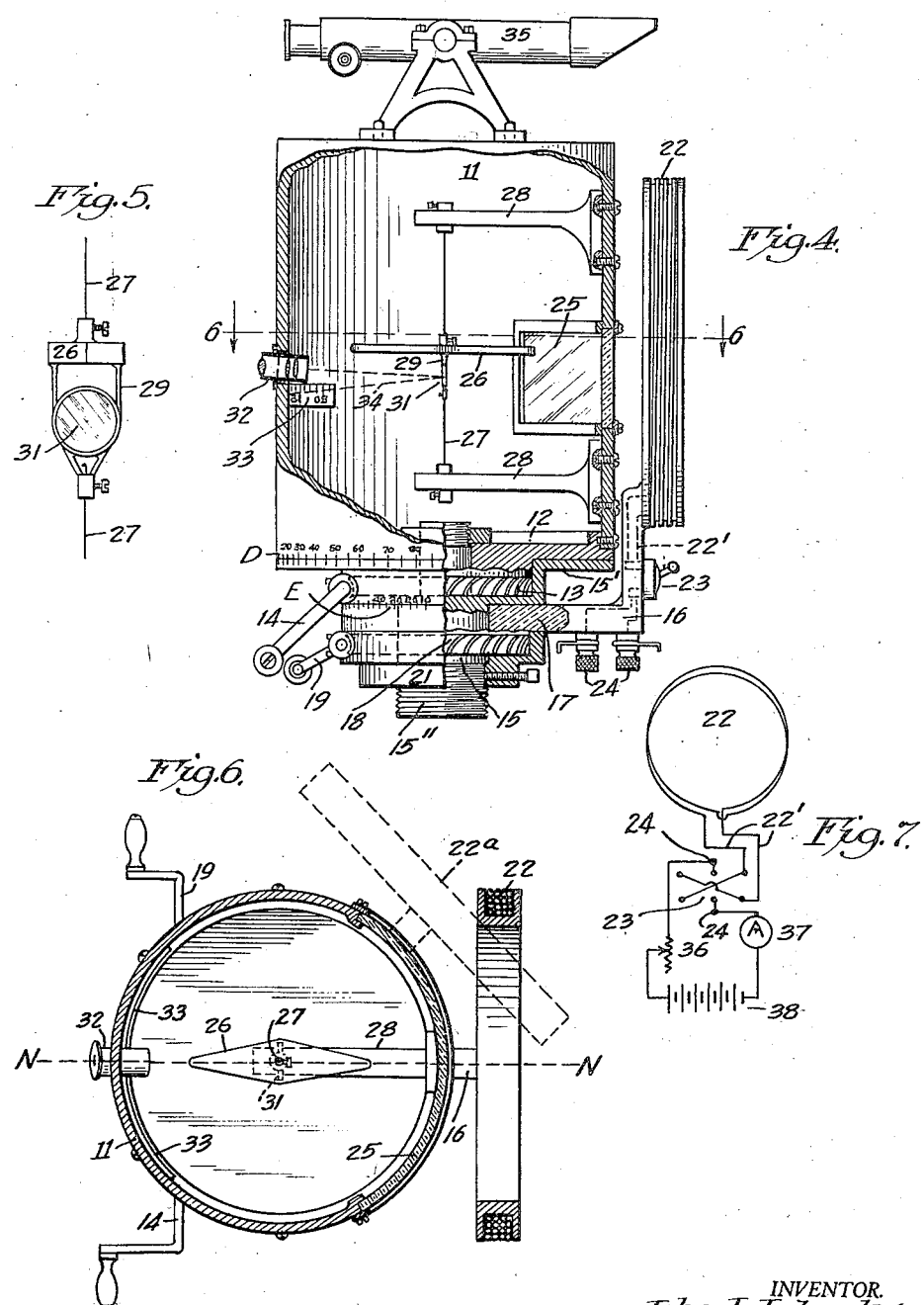

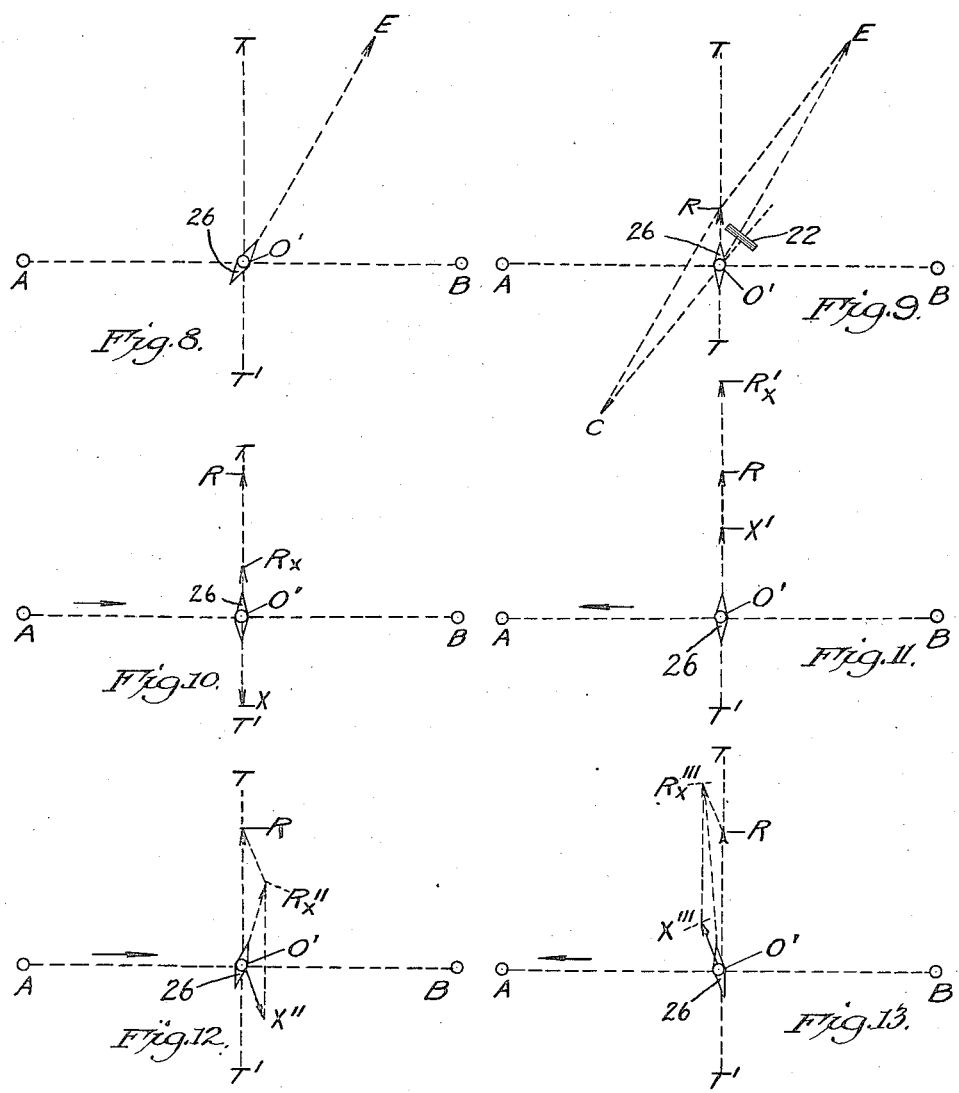

Patented May 2, 1933

1,906,271

UNITED STATES PATENT OFFICE

JOHN J. JAKOSKY, OF LOS ANGELES, CALIFORNIA

METHOD AND APPARATUS FOR DETERMINING UNDERGROUND STRUCTURE

Application filed June 1, 1931. Serial No. 541,233.

This invention relates to the study of underground structure by means of observations made at the earth's surface. More particularly, it relates to the determination of inhomogeneities in the electrical conductivity of the underground structure, by measurements at the surface which are dependent upon such inhomogeneities. Such inhomogeneities may be due, for example, to the presence of mineralized bodies or the like which are of relatively high conductivity as compared to the surrounding structure, or to the occurrence of faults or other discontinuities in the earth's structure, or to the presence of bodies of salt water or other liquids of a different conductivity from the structure in which they are situated. The invention, however, is particularly applicable to the location of underground conductive bodies, such as ore bodies, and certain parts of the following description will be directed principally to this application thereof.

More specifically, the subject of this invention comprises an electromagnetic method of underground survey comprising the passage of electric current through the earth and the measurement of the magnetic field created by such current flow, and an apparatus for effecting such current flow and magnetic measurement.

It is the principal object of this invention to provide a more sensitive, more accurate and more convenient method and apparatus for underground survey by means of surface observations, whereby errors due to surface and near-surface inhomogeneities and errors emanating from disturbances occasioned by near-by accessory equipment are eliminated or reduced to a negligible minimum and observations more truly indicative of conditions at substantial depths may be made.

A further object of this invention is to provide an electromagnetic method and apparatus for underground survey in such a manner that the errors common to the inductive methods of underground survey such as, for example, eddy current and phase effects, are substantially eliminated.

In previously used methods of underground survey in which measurements are obtained by causing electric current to flow through the earth and taking observations of the electromagnetic field thus created, it has been customary to measure such electromagnetic field by inductive methods, that is, by causing such field to induce an electric current in a loop, coil or other detecting circuit, and in order to obtain an induced current of sufficient intensity to permit accurate measurement thereof, it has been found generally necessary to use a primary current of relatively high frequency. In one specific instance it has been proposed to use unidirectional current and to measure the resulting electromagnetic field by means of the current induced in a rotating coil.

The method of the present invention comprises causing an electric current to flow through the earth between two separated points and taking direct measurements, at the surface, of the intensity and if desired, the direction, of the magnetic field set up by such an underground current flow.

The electric current employed is preferably current other than high frequency current, or more specifically, other than current having a frequency in excess of 100 cycles per second, that is to say, the current employed is preferably either unidirectional current or an alternating current having a frequency less than 100 cycles per second.

The method of the present invention is clearly differentiated from all hitherto proposed methods of underground survey particularly in that the strength of the magnetic field set up between artificially established current flow through the earth is measured directly by magnetic means. In other words, instead of measuring a current set up inductively in a coil or other inductive detecting circuit by the artificially produced field, the attractive effect of the artificially produced field upon a magnetic measuring device is observed. In case unidirectional current is passed through the earth the magnetic measuring device may comprise a permanently magnetized bar-magnet, such as for example the well known Askania-Schmidt type of horizontal field balance or a bar-magnet of the type hereinafter described, and in case alternating current is passed through the earth the magnetic measuring device may comprise a conductor through which a unidirectional current of known intensity is passed, while said conductor is exposed to the influence of the artificially produced alternating magnetic field.

Measurements of the magnetic field are ordinarily made at a plurality of points on the earth's surface, the current flow through the earth being kept substantially constant, so that the relative intensity and direction of the magnetic field at the several points affords an indication of the path of underground current flow, and hence of the underground structure.

The method of the present invention may advantageously comprise passage of a direct current through the earth between two separated electrodes in contact with the earth and located at the surface of the ground or at other convenient locations, and measurement of the magnitude and direction of the horizontal component of the magnetic field thus created, at stations positioned along lines perpendicular to a line joining the two electrodes and in a region adjacent the mid-point between said electrodes, as by means of a swinging bar-magnet, or other suitable magnetometer, while maintaining an auxiliary field at the position of the magnetometer of such direction and magnitude as to produce, with the earth's magnetic field, a resultant magnetic field of known direction and magnitude so as to permit accurate measurement of the magnetic field set up by the underground current flow.

The auxiliary field above referred to is preferably created in a direction other than that of the earth's field. The strength of the field produced by the current flow between the electrodes is customarily on the order of 5 to 50 gammas and the strength of the resultant between the earth's field and the auxiliary field may be established at some value between 25 and 500 gammas.

The method of the present invention may also comprise passage of an alternating current of relatively low frequency through the earth between two similarly located separated electrodes and measurement of the magnitude and direction of the horizontal component of the established alternating magnetic field at stations positioned along lines perpendicular to a line joining the two electrodes and in a region adjacent the mid-point between said electrodes, as by means of a vibrating wire magnetometer wherein may be observed the vibration of a wire due to the passage of a direct current of a certain intensity through said wire when said wire is in the established alternating magnetic field, while preferably compensating the magnetometer for the influence of the earth's magnetic field.

The method of the present invention may also comprise establishing a flow of current through the earth between two widely separated electrodes and taking magnetometer observations about one of said points of current introduction while compensating the magnetic measuring device for the influence of the earth's magnetic field, to determine the distribution of current flow to or from said one point.

The apparatus of the present invention may comprise, in general, energizing circuit means comprising a source of either direct current or low frequency alternating current and a suitably disposed external conductor provided with electrode means for maintaining an electric potential between two spaced points on the earth, so as to cause current flow through the earth between said points, and magnetic measuring means adapted to be mounted at points on the earth's surface between said electrodes or in the vicinity of one of said electrodes and preferably adapted to measure the horizontal component of the magnetic field at such points.

In the first mentioned application of my method to underground survey, I prefer to use a horizontal component magnetometer of high sensitivity, such as a magnetometer comprising a temperature compensated bar magnet supported by vertical torsion wires so as to swing in a horizontal plane, provided with means for establishing an auxiliary magnetic field in opposition to the earth's horizontal component so as to produce a resultant magnetic field of relatively low known intensity along a known azimuth. In a magnetometer of the above type, the direction assumed by the bar magnet is indicative of the direction of the horizontal component of the magnetic field, while the period of oscillation thereof is dependent upon the strength of the magnetic field. The magnetometer is preferably also provided with means whereby the angular deflection of the moving element as well as the period of oscillation thereof may be observed.

In the second mentioned application of my method of underground survey, I prefer to use a measuring instrument of the type known as a "vibrating wire" magnetometer (or vibrating string galvanometer), wherein a pair of highly permeable magnetic alloy bars are aligned end-to-end in the direction of the magnetic field to be measured, said bars being separated from each other by a thin airgap and having suspended in said airgap, equidistant from each bar and perpendicular to the axis of alignment of said bars, a thin wire through which a direct current of known intensity may be passed. Upon the passage of an alternating current through the ground between the two electrodes, an alternating magnetic field is established about the path of the subterranean current flow, which magnetic field will magnetize the two magnetic alloy bars, and, upon the flow of a direct current through the suspended wire in the magnetic field between the opposing ends of said bars, said wire will vibrate at a frequency dependent upon the frequency of the current introduced through the earth and to an amplitude dependent upon the intensity of the produced alternating magnetic field and the intensity of the direct current passing through the suspended wire.

The above instrument is preferably provided with means for observing the amplitude of vibration of the suspended wire and such means may consist, for example, of a microscope lens system focused upon said wire and projecting an image of the wire upon a ground-glass plate or a photographic film, together with illuminating means whereby the wire is provided with sufficient illumination to allow of satisfactory observation thereof. The apparatus is also preferably provided with means whereby the effect of the earth's magnetic field may be compensated so that the vibrating wire will vibrate equally either side of the normal rest position.

In the third mentioned application of my method to underground survey a direct current may be caused to flow between the electrodes and measurements taken (adjacent one of said electrodes) by suitable unidirectional magnetic measuring means such as the torsion bar-magnet above described, or an alternating current may be caused to flow between the electrodes and measurements taken adjacent one of said electrodes by suitable alternating magnetic measuring means, such as the vibrating wire magnetometer above described.

The accompanying drawings illustrate schematically my method of underground survey and also show forms of apparatus in accordance with my invention. Referring to the drawings:

Fig. 4 is a partly sectional vertical view of a form of magnetometer adapted to be used in method when direct current is employed;

Fig. 5 is a detail of a portion thereof on somewhat enlarged scale;

Fig. 6 is a section of Fig. 4 on line 6—6 therein;

Fig. 7 is a schematic layout of the wiring diagram for the compensating coil for the magnetometer shown in Figs. 4—6;

Figs. 8 to 13 show schematically, in plan view, the various steps in the compensation of the earth's magnetic field and the observation of the direction and magnitude of the horizontal component of the magnetic field produced by the passage of a direct current through the earth;

Figure 1:
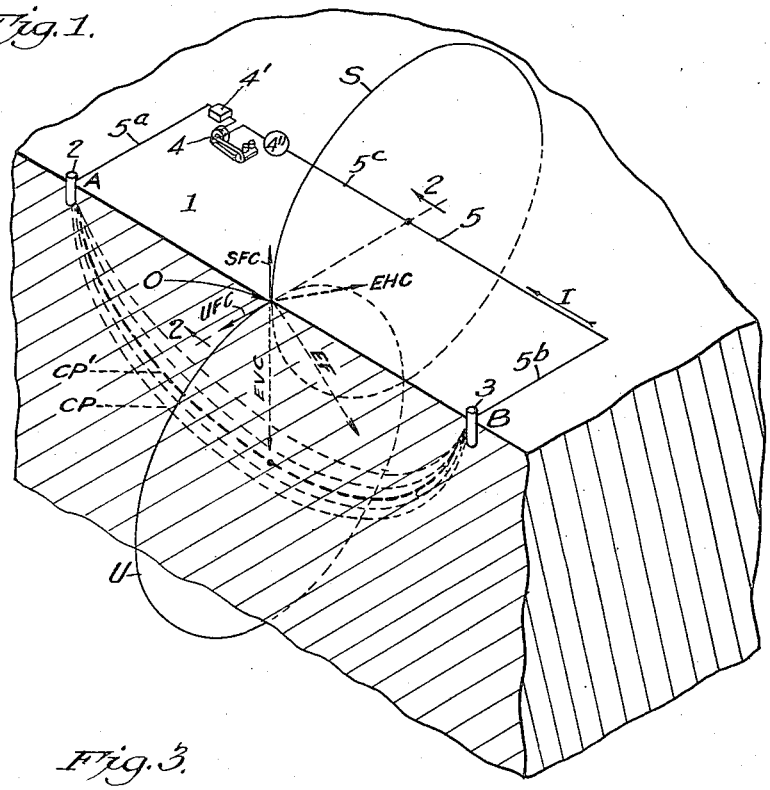
Fig. 1 is an isometric partly sectional view of a portion of the earth's surface showing a schematic layout of apparatus which may be used according to my method of underground survey, together with a schematic representation of the magnetic fields produced upon the passage of a current between the two electrodes.
Figure 3:
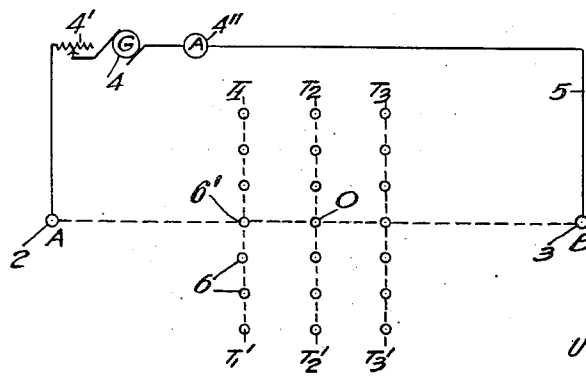
Fig. 3 is a plan layout of the apparatus and observation stations.
Figure 2:
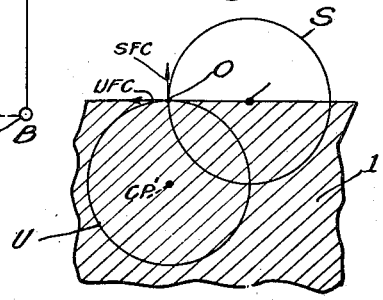
Fig. 2 is a section thereof on line 2—2 in Fig. 1.

Referring to Figs. 1 to 3, the numeral 1 indicates a section of the earth's surface layer where an underground survey is contemplated. The numerals 2 and 3 indicate partially embedded electrodes provided at points A and B respectively, said electrodes having electrical connection to a suitable source of electrical energy such as a generator 4 through an insulated surface-level conductor 5 conducting electrical energy from the generator 4 through a suitable variable resistance 4' and an ammeter 4'' to the electrodes 2 and 3 and thence through the earth to provide a complete electrical circuit. With such an arrangement, magnetic measurements may be taken either in the region adjacent the mid-point between the electrodes 2 and 3 as shown in these figures, or adjacent one of said electrodes, as will be described hereinafter with reference to Fig. 17.

The surface conductor 5 preferably comprises lateral portions 5a and 5b extending from the respective electrodes 2 and 3 perpendicular to the line between said electrodes, and a longitudinal portion 5c connecting said lateral portions and extending parallel to and spaced from the line A—B. Said conductor extends upon or adjacent the surface of the earth and is insulated therefrom in any suitable manner, and preferably extends in a horizontal plane passing through the position at which observations are to be made, or as nearly in such plane as is practicable. The distance between points A and B should be relatively great in comparison with the depth to which the survey is intended to penetrate into the earth, for example approximately three times such depth, and the distance of the longitudinal conductor portion 5c from the line AB should be as great as convenient. In level country this distance may be made relatively great, so as to minimize any possible effect of the magnetic field about the surface conductor on the measuring instrument at the point of observation but when the earth's surface has considerable slope this distance may necessarily be reduced in order that the conductor 5 may be as nearly as possible in the horizontal plane in which magnetic measurements are taken. However, it may be pointed out that the greater the distance of the conductor 5 from the point of observation the less will be the magnitude of the magnetic field about said conductor at the point of observation, so that even in sloping country it may be preferable to locate the conductor at a considerable distance from the line A—B, even though this may require that said conductor be considerably above or below the horizontal plane through the point of observation. The point O represents a point of observation at which magnetic measurements are to be made, said point being at the earth's surface, and being shown in this case as located on the line A—B and midway between points A and B.

The circle S represents the magnetic field through point O set up by the passage of current through the portion 5c of the conductor 5 which is parallel to the line joining the electrodes, and the circle U represents the magnetic field through point O set up by the passage of current through the earth along the dotted lines CP. Inasmuch as the magnetic field set up in the earth due to the flow of current therethrough is a summation of the fields set up around each individual current path, an average path, such as is represented by the heavy dotted line CP' may be taken as a path which serves as a center for the magnetic field induced by the flow of current in the earth. If the surface level conductor 5 is substantially at the level of the point O, the magnetic field set up by the passage of current through said conductor will obviously have substantially no horizontal component at point O or any point at the same level at which observations are being taken, and will thus have no appreciable effect upon a horizontal component magnetometer at such a point. But due to the fact that the intensity of the magnetic field about a linear conductor varies inversely as the distance from the conductor, the effect of this horizontal component upon the magnetometer will be relatively small.

The dotted arrow EF represents, as an example, the direction and magnitude of the earth's magnetic field, the vertical component of which is represented by the dotted arrow EVC and the horizontal component of which is represented by the dotted arrow EHC. When the direction of flow of the current in the conductor 5 is in the direction indicated by the arrow I, Fig. 1, the direction and magnitude of the magnetic field about the longitudinal conductor portion 5c may be represented by the vertical arrow SFC.

In the case the underground structure through which the current flow lines CP pass is of perfectly uniform conductivity, the line CP' representing the mean effective path of current flow will lie directly below the line A—B. The magnetic field set up in the earth by a passage of current in the circuit as indicated above will, under these conditions, have no vertical component at the observation point O but will have a horizontal component which may be indicated by the arrow UFC. The magnetic fields set up about the lateral conductor portions 5a and 5b upon passage of current therethrough will also be vertical or substantially so at points in the horizontal plane of the conductor, and will therefore have no effect on a horizontal component magnetometer at the point O.

Figure 15:
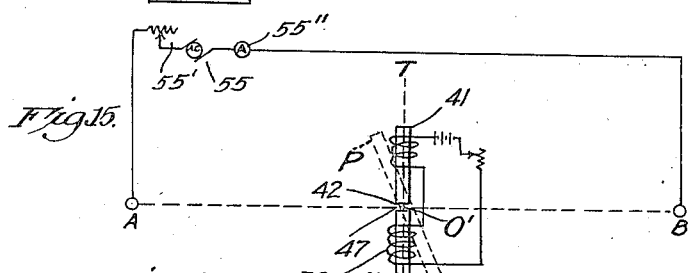
Fig. 15 is a schematic illustration of the method of observation of the direction and magnitude of the horizontal component of an alternating magnetic field produced by an underground flow of alternating current.

Fig. 3 illustrates a plan layout of the area to be prospected in which are shown three suitably spaced traverses, $T_1$—$T_1'$, $T_2$—$T_2'$ and $T_3$—$T_3'$ perpendicular to the line A—B, along each of which a plurality of suitably spaced observation stations 6 are established, independent magnetic observations being taken at each point and the results correlated, for example, as shown in Fig. 15.

In case of perfect homogeneity of subterranean conductivity, the horizontal component of the magnetic field set-up by the underground current flow, at different points along any one of these traverses, will obviously have a maximum intensity at the center point of such traverse, such as the point 6' and the intensity will steadily decrease as the point of observation moves outwardly at either side of the line A—B. Furthermore, the azimuth of such horizontal component will lie in a direction perpendicular to the line A—B. Therefore, if proper steps are taken to compensate the magnetometer for the horizontal component of the earth's magnetic field, and accurate measurements are made of the intensity and direction of the horizontal component UFC of the magnetic field created by the underground current flow, any deviation from these conditions will be caused by an inhomogeneity in the subterranean conductivity and will give indications which may be utilized to determine the nature and location of such inhomogeneity.

It may be pointed out that this method may be used to much better advantage for surveys of conditions at great depths than may the so-called "potential-drop" methods in which measurements of the electrical potential between points at the surface are depended upon, for in such methods the variation in current distribution at great depths will have but little effect upon the current distribution at the surface, and the measurements are affected solely by the surface and near-surface current distribution, while in the method of the present invention the measured magnetic field is the summation of the magnetic fields created by the deep-lying current flow as well as the surface flow, so that when a highly conductive body is present, even though at considerable depth, the relatively high current flow through such a body will produce a predominating effect on the magnetic measurements.

Figs. 4 to 6 illustrate a form of bar-magnet magnetometer which is adapted to be used as a horizontal component measuring means when direct current is passed between the electrodes and through the earth, and referring thereto; numeral 11 indicates a cylindrical instrument case or housing, preferably formed of aluminum or other non-magnetic material, provided with a glass window 25 for the purpose of allowing light from any source to fall on the interior of the case. A temperature compensated bar-magnet 26 is supported to swing in a horizontal plane by means of vertical torsion wires 27 secured to magnet support arms 28, preferably formed of bakelite or other non-metallic material, secured to the side wall of the case 11. The line of suspension of the bar-magnet by the torsion wires 27 constitutes the axis of rotation of said magnet.

Said bar-magnet is provided with a depending mirror support 29 provided with a mirror 31, said mirror being preferably of bright-surfaced metal such as stainless steel or the like and disposed in a vertical plane perpendicular to the longitudinal axis of the magnet 26 and passing through the axis of rotation thereof. A viewing telescope 32 is provided in the side wall of the case 11 so that an image of a graduated scale 33, disposed on the side wall of the case 11 below and extending equally each side of the center of the telescope, may be observed by reflection from the mirror 31, as shown by the dotted lines 34. The torsion wires 27 are adjusted so that the bar magnet will have a normal position such that its longitudinal axis is in the plane of the vertical axis of the viewing telescope when no magnetic field is present about the magnet as indicated by the dotted line N—N, Fig. 6, in which case the center mark on the scale 33 will be centered in the viewing telescope 32.

A removable sighting telescope 35 is provided on the top of the case 11, disposed so that the axis of the telescope is in the plane of the vertical axis of the viewing telescope 32.

The instrument case is provided with a base portion 12 having a gear 13 in operative association with worm gear operating means 14 disposed on the instrument base 15. The instrument base 15 is provided with a flanged portion 15' in slidable supporting engagement with the outer under surface of the housing base portion 12, said portion 12 being adapted to rotatably slide on the flange portion 15' upon operation of the worm operating means 14 and effect rotation of the instrument case 11 and the parts carried thereby. The respective peripheries of portions 12 and 15' are provided with suitable graduations or markings D whereby the degree of rotation of the instrument case and the thereto secured magnet supporting means with respect to the instrument base may be observed.

Auxiliary field coil support 16, comprising a collar portion 17 in rotatable engagement with instrument base 15 is shown as provided with a worm wheel 18 in operative association with worm operating means 19 disposed on collar 21 secured to the base 15 whereby auxiliary field coil 22, disposed on coil support 16 in such a manner that the magnetic axis of the coil lies substantially in the plane of rotation of bar-magnet 26 and intersects the axis of rotation thereof, may be rotated about the instrument case 11 as shown by dotted lines 22a, so as to provide for variation of direction of the magnetic axis of the coil, said magnetic axis at all times intersecting the axis of rotation of said magnet and lying in the plane of rotation thereof. The auxiliary field coil collar 17 and the base 15 may be provided with suitable graduations or markings E whereby the degree of rotation of said coil with respect to the base 15 may be observed. The auxiliary field coil 22 is shown as provided with binding posts 24 providing electrical connection to the coil through reversing switch 23 by means of coil leads 22'.

The instrument is preferably mounted for use on a tripod provided with a leveling head and adapted to receive the threaded lower end portion 15" of the instrument base 15; such tripod and leveling head are, however, not shown for the reason that the construction thereof is well known and is not essential to this application.

A typical wiring diagram showing the method of energizing the coil 22 is shown in Fig. 7, in which the leads 22' are shown connected to the reversing switch 23 which is provided with electrical connection to a suitable source of direct current such as a battery 38, through suitable current regulating and indicating means such as a variable rheostat 36 and ammeter 37.

In conducting an actual survey with the use of direct current in the energizing circuit and with a magnetometer of the above described type for measuring the resulting unidirectional magnetic field, a layout similar to that shown in Fig. 3 is followed. The magnetometer instrument is set up, on a suitable tripod or other support, at a point such as O on the transverse $T_2$—$T_2'$. The instrument is oriented by manipulation of the worm operating means 14 so that the sighting telescope is directed along the transverse line, in which position an imaginary line drawn from the point $T_2$ would pass through the instrument along the line N—N in Fig. 6. The azimuth of the instrument may now be read from scale means D.

Assuming, for purposes of illustration, that the instrument, positioned at O', is oriented along any traverse T—T', Fig. 8, wherein the points A and B represent the position of the electrodes for introducing current to the earth and the dotted arrow OE may be taken as representing the horizontal component of the earth's field. The magnet 26 will be displaced from the line N—N and will oscillate about its axis of rotation substantially an equal distance each side of the line O'E due to the effect of the earth's field on said magnet, and the period of oscillation thereof will be a measure of the strength of the horizontal component of the earth's field at that point, according to the formula $$H = \frac{\pi^2 K}{T^2 M}$$

wherein H is the strength of the magnetic field, $\pi = 3.14159+$, K = the moment of inertia of the bar-magnet, T is the observed period of oscillation of the bar-magnet and M is the magnetic moment of the magnet. It is not necessary, however, to observe the frequency of oscillation of the magnet bar at this time.

Referring to Fig. 9, the next step consists in energizing the auxiliary field coil 22 by means of current from the battery 38, and varying the current in said coil and orienting the same by means of the worm-operating means 19 to produce a new magnetic field O'C so that the resultant of the two fields O'R will be along a known line, such as the line T—T' and of a sufficiently low intensity that a readable resultant period of oscillation of say one second is obtained by the magnet. The scale 33 will then be seen, by observation through the telescope 32, to swing an equal distance either side of the center mark. The period of oscillation is preferably observed by measuring with a stop-watch the time required for a given number of oscillations, for example ten oscillations. The strength of the resultant field O'R is calculated from the observed period of oscillation. The magnetic field set up by the current in the coil 22 therefore serves the dual purpose of orienting the magnet bar in a definite direction and also reducing the intensity of the effective magnetic field to such a point that the magnetic field set up by underground current flow as hereinafter described will cause a sufficient proportional variation in intensity of the total magnetic field to permit accurate observation thereof.

The orientation of the resultant between the earth's field and the auxiliary field is made along the line T—T' solely for purposes of convenience. This resultant must be in a known direction and of a known intensity in order to allow computation of the direction and intensity of the field generated by the subterranean current flow and inasmuch as it is convenient to definitely establish a particular line along which to produce the earth's field resultant during any one series of observations, such a line may be along the traverse T—T' and is so considered for the accompanying illustrations.

If a current is now passed through the earth from A to B, by means of the energizing circuit including generator 4 and surface conductor 5, a magnetic field will be set up about the underground current flow, as indicated by circle U, Fig. 1, which will have a horizontal component at the point of observation as indicated by the arrow O'X in Fig. 10, which horizontal component may have a direction along the line T—T' and the current flow between the two electrodes is preferably so adjusted that the component O'X is of somewhat less magnitude than the earth's field resultant O'R, which under conditions as set forth in Fig. 1, will make no change in the direction of the magnet 26 but will cause a change in the period of oscillation thereof, the resultant of the fields O'R and O'X being the algebraic summation of the strength of the two fields. The strength of the new resultant O'R$_x$ is then calculated from the observed period of oscillation and subtracted from the calculated strength of O'R and the result is the strength of the field O'X produced by the passage of the current through the earth.

The current is then reversed so that an underground current flow is established from B to A and the resultant magnetic field will be in the direction O'X' (Fig. 11) and the period of oscillation of the magnet 26 will be decreased due to the increase in the strength of the magnetic field over the fixed value of O'R. The strength of the new resultant O'R$_x$' is then calculated and the strength of the field O'R subtracted from it and the result compared with the result obtained when the current was passed from A to B. These two results may be averaged to eliminate errors resulting from slight misalignment of the apparatus.

The symmetric disposition of the subterranean current flow with respect to the line joining the two electrodes as indicated in Fig. 1 will not, in general, be encountered in the field, and in many cases the inhomogeneity of the underground structure will be such that the horizontal direction of the average path of current flow beneath any particular traverse will not extend parallel to said line between the electrodes, but will extend at some horizontal angle with respect thereto, and in such cases the horizontal component of the generated field will not be disposed along a traverse line but at an angle thereto, as indicated at $O'X''$ in Fig. 12 and $O'X'''$ in Fig. 13.

Under these conditions, the field resulting from the passage of a direct current from A to B may have a direction and intensity as indicated vectorially at $O'X''$ in Fig. 12, in which case the resultant between $O'X''$ and $O'R$ will be at a new azimuth and of a different intensity, as indicated at $O'R_x''$. The deflection produced on the magnet 26 will be detected by observing the scale 33 through the view telescope 32 and the instrument case 11 is then rotated by means of worm operating means 14 until the oscillation of the magnet has an equal amplitude either side of the center of the scale 33, at which time the period of oscillation may be observed and the degree of deflection of the field with respect to the line $O'T$ may be determined by reference to the scale D, and the direction and magnitude of the field $O'X''$ calculated.

A reversal of the current flow between A and B will produce an opposite field such as shown at $O'X'''$, Fig. 13, which will produce a new resultant $O'R_x'''$ with the field $O'R$, as shown. The instrument case is then rotated in the opposite direction to a point where the oscillations of the magnet are equally great either side of the center mark, the period of oscillation and the degree of deflection taken as above and the strength and direction of the field $O'X'''$ calculated and averaged with the previous result as in the above case.

Figure 14:
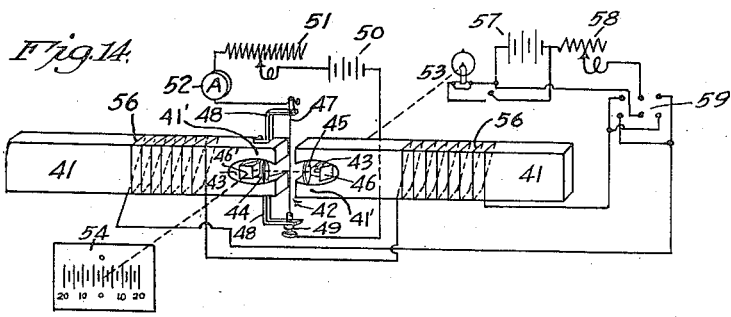
Fig. 14 is a somewhat schematic perspective view of a vibrating wire magnetometer suitable for use in my invention when alternating current of low frequency is employed.

Fig. 14 illustrates a type of vibrating wire magnetometer suitable for measurement of an alternating magnetic field, comprising two high permeability magnetic alloy bars 41 mounted end-to-end so as to have a narrow air-gap 42 between the adjacent ends 41' and provided with slots 43 in which are mounted lens systems 44 and 45 and reflecting prisms 46 and 46'. A thin wire 47 of highly conductive material is suspended in the gap 42 from supports 48 which may be disposed, if desired, upon one of the bars 41, said supports being preferably formed of insulating material. A tension regulating device may be provided on one of the supports as indicated at 49 whereby the tension of the vibrating wire may be adjusted so that the natural period of vibration thereof is equal to the period of alternation of the current passed through the earth, providing maximum sensitivity of the instrument. A source of direct current is provided for the wire 47 as by means of battery 50, together with suitable variable resistance 51 and an ammeter 52 whereby the intensity of the current passing through the wire 47 may be controllably varied. An illuminating device 53 is additionally provided whereby light may be directed onto the wire 47 through the prism 46 and the lens 45 so that an image of the wire may be projected by the lens 44 through the prism 46' on the ground glass scale 54. The instrument is preferably provided with a suitable support, having levelling means not shown, so that the bars 41 may be disposed in a horizontal plane and oriented in any desired direction. A winding 56 is provided about the magnetic alloy bars 41 through which a direct current from a battery 57 may be passed through a variable resistor 58 and a reversing switch 59 for the purpose of providing a unidirectional magnetic field cutting the wire 47 in opposition to the earth's field.

I am aware of the fact that types of vibrating-wire magnetometers have been used for the purpose of recording or indicating variations in the strength of a unidirectional magnetic field, such as, for example the earth's field, wherein an alternating current of known strength was passed through the wire, causing said wire to vibrate in said unidirectional field. The device shown in Fig. 14, however, is adapted primarily for the measurement of the strength of alternating magnetic fields and differs from the previous vibrating-wire magnetometer above referred to, in that unidirectional current is passed through the wire.

In conducting a survey in accordance with this invention, using alternating current of low frequency for energization, the arrangement of the energizing circuit with respect to the positions of observation is substantially the same as above. When an instrument of the above type is used for making measurements of the alternating magnetic field, it is set up on a traverse in the same manner as with the first described form of magnetometer device, properly levelled and oriented so that the magnetic alloy bars 41 are disposed along a traverse line perpendicular to the line between the electrodes, as illustrated in Fig. 15, wherein the instrument is shown as stationed at an observation point $O'$ as in the examples shown in Figs. 8 to 13. The magnetic bars 41 are oriented along the line T—T' and a direct current passed through the wire 47. The wire will be pushed to one side of the center line due to the effect of the earth's magnetic field and coil 56 may be energized to neutralize the effect of the earth's field and bring the wire 47 to the center position. An alternating current of relatively low frequency, preferably less than 100 cycles per second for ordinary work and preferably less than 20 cycles per second for deep structure observations, is then supplied to the electrodes A and B as by means of an alternating current generator 55 and the resulting underground current flow between the electrodes at A and B will set up an alternating magnetic field which will induce a comparable field in the magnetic alloy bars 41 and in the gap 42 therebetween and thus cause the wire 47 to vibrate at a frequency the same as that of the exciting current, and to an amplitude dependent upon the strength of the excited field and the intensity of the current passing through the wire 47.

When an alternating current of relatively low frequency, such as above mentioned, is used, errors due to secondary fields induced by the primary field generated by the flow of current between the electrodes are not found for the reason that at low frequencies the strength of the secondary induced fields is very low and the instrument is not influenced thereby. The instrument is now oriented until the amplitude of vibration of the wire 47 is at a maximum for example, to such a position as shown by dotted lines at P, Fig. 15, the current in the coil 56 is adjusted so as to zero the reading on the scale, that is, so that the vibrations of the wire extend an equal distance either side of the zero mark on the scale, and the current in the wire 47 is adjusted so as to produce a predetermined amplitude of vibration and the value of said current is observed by means of the ammeter 52. The strength of the alternating magnetic field may then be calculated from the formula $$H = \frac{K}{I},$$

wherein H is the strength of the magnetic field, K is a determined constant of the instrument and I is the intensity of the current flow in the wire 47 in amperes.

The above described type of magnetometer may also be used in cases where a direct current is passed through the earth if desired, in which case an alternating current is passed through the vibrating wire in place of the direct current as above described. The operation of the device remains substantially the same as in the case where an alternating current is passed through the earth and a direct current is passed through the vibrating wire.

When either of the above forms of apparatus is used in a method in which direct current is passed through the earth, it may be advisable to make use of "non-polarizable" electrodes for introducing the current to the earth. Such an electrode may consist of a carbon rod immersed in a saturated solution of ammonium sulphate, $(NH_4)_2SO_4$, contained in a heavy canvas case which is buried in the ground. In the use of non-polarizable electrodes, the chemical relations established at the electrodes do not change with the passage of a current. When an alternating current is passed through the earth, the effect of polarization is neutralized by the successive reversals of the direction of the passage of the current and the use of non-polarizable electrodes is not necessary.

Figure 16:
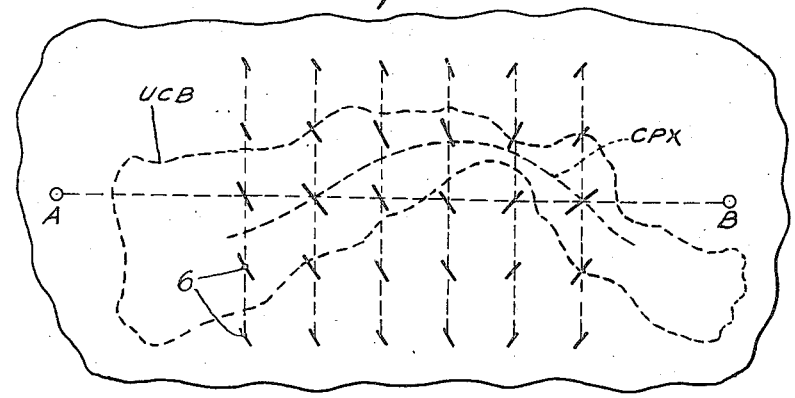
Fig. 16 is a chart of a prospected area showing the results of surface observations and the deductions therefrom.

In Fig. 16 there is shown a chart of a prospected area with the direction and intensities of the observations plotted vectorially at each observation point 6. From a study of the plotted observations it may be seen that the mean effective path of underground current flow is such as indicated in plan view by the dotted line CPX and that a subterranean inhomogeneity such as an ore body may be presumed to be present, following some such outline as shown by the dotted line UCB. Furthermore, the rate at which the horizontal component of the measured magnetic field diminishes, along each traverse, at either side of the point of maximum intensity, will give an indication as to the approximate depth of the mean current path CPX, and consequently the depth of the ore body or the like.

Figure 17:
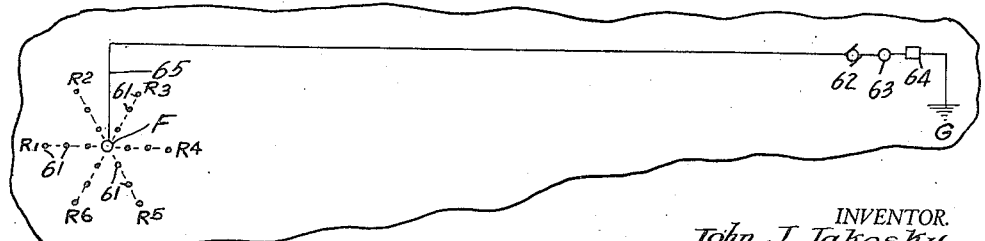
Fig. 17 is a schematic layout illustrating the method whereby observations are taken about a single electrode.

When the single electrode system is employed, an arrangement such as is shown in Fig. 17 may be used, wherein a generator 62, provided with an ammeter 63 and a variable resistance 64 is connected to the earth at points considerably removed from one another, such as at F and G, by means of conductors 65 and 66. Observations of the magnitude and direction of the resulting magnetic field are taken about one of the points of connection to the earth, for example F, in any suitable symmetrical manner as for example, along the radii $R_1, R_2, R_3, R_4, R_5, R_6$, at points such as 61, so as to obtain indications of the distribution of the current flow to or from said electrode when said electrode is energized by current from the generator 62. The other point of connection of the generator circuit with the earth is preferably placed sufficiently distant from the electrode about which magnetic observations are being taken so that the flow of current toward or away from the electrode F has no appreciable directional tendency toward the electrode G. In this case, also, either direct current or alternating current may be employed, and one of the types of magnetometer above described, or any other suitable type of magnetometer, may be used for measuring the magnetic field.

While the invention has been described as comprising introduction of the electric current into the earth by means of electrodes located at the surface, it will be understood that it is not limited in this respect, as the electrodes may be connected to the earth at any accessible points, for example in underground shafts or tunnels where the same are available.

I claim:

1. The method of determining underground structure which comprises causing electric current to flow in a circuit including an external path insulated from the earth and connected thereto at two separated points and an underground path between said separated points, and measuring by magnetometric means the horizontal component of the magnetic field created by such current flow at a point substantially in the horizontal plane of said external current path.

2. The invention as set forth in claim 1, said current flow being unidirectional.

3. The invention as set forth in claim 1, said current flow being alternating current of low frequency.

4. The method of determining underground structure which comprises causing electric current to flow in a circuit including an external path insulated from the earth and connected thereto at two separated points and an underground path between said separated points, and measuring the azimuth and magnitude of the horizontal component of the resulting magnetic field at a plurality of points substantially in the horizontal plane of the external path.

5. The method of determining underground structure which comprises causing electric current to flow in a circuit including a conductor extending outside the earth and insulated therefrom and having its ends connected to the earth at two separated points and also including an underground path between said separated points, and taking measurements of the horizontal component of the magnetic field created by said current flow at a plurality of points between said separated points, while maintaining said conductor substantially in the horizontal plane passing through each point at which such measurements are taken.

6. The method of determining underground structure which comprises setting up an auxiliary magnetic field at a point of observation on the earth's surface, said auxiliary field having such direction and magnitude as to produce, with the earth's field, a resultant field in a known direction and of less magnitude than the earth's field, causing electric current to flow through the earth between two points spaced at opposite sides of said point of observation, and determining by means of a magnetometer the magnitude of the horizontal component of the magnetic field created at said point of observation by said current flow by measurement of the combined effect of the said resultant field and the field created by said current flow.

7. The method of determining underground structure which comprises setting up an auxiliary magnetic field at a point of observation on the earth's surface, of such direction and magnitude as to produce with the earth's field, a resultant field in a known direction and of less magnitude than the earth's field, causing electric current to flow through the earth between two points spaced at opposite sides of said point of observation, and determining the magnitude, at said point of observation, of the magnetic field created by such current flow, and the departure of the direction of said created magnetic field from said known direction.

8. The method as set forth in claim 7 and further comprising the repetition thereof at additional points of observation spaced from said first named point of observation along a line extending perpendicular to a line joining said spaced points, said two spaced points between which the current flows through the earth being the same in each case.

9. An apparatus for determining underground structure comprising energizing circuit means comprising a source of alternating current of a frequency less than 100 cycles per second and a conductor disposed adjacent the earth's surface and insulated therefrom between its ends and provided at its ends with electrode means in contact with the earth at two spaced points whereby the circuit is completed through the earth between said electrode means, and magnetometer means at the earth's surface between said electrode means and adapted to measure the horizontal component of the alternating magnetic field produced by flow of alternating current in said circuit and through the earth between said electrode means.

10. An apparatus for determining underground structure comprising energizing circuit means comprising a source of current and a conductor disposed adjacent the earth's surface and insulated from the earth between its ends and provided at its ends with electrode means in contact with the earth at two spaced points, and magnetometer means at the earth's surface between said electrodes for measuring the horizontal component of the magnetic field produced by flow of current in said circuit and through the earth between said electrode means, said conductor extending substantially in a horizontal plane passing through said magnetometer means.

11. An apparatus for determining underground structure comprising energizing circuit means comprising a source of current and a conductor extending adjacent the earth's surface and insulated therefrom between its ends and provided at its ends with electrode means in contact with the earth at two spaced points whereby the circuit is completed through the earth between said electrode means, magnetometer means at the earth's surface between said electrode means for measuring the horizontal component of the magnetic field produced by flow of current in said circuit and through the earth between said electrode means, and means associated with said magnetic measuring means for creating an auxiliary magnetic field in a direction other than the earth's field and of such direction and magnitude as to permit accurate measurement of the magnetic field produced by said current flow in the presence of the resultant effect of the earth's field and said auxiliary field.

In testimony whereof I have hereunto subscribed my name this 8th day of May 1931.

JOHN J. JAKOSKY.